Mar. 3, 1925.
G. E. LUCE
1,528,557
ROPE CONVEYER
Filed May 31, 1923
2 Sheets-Sheet 1
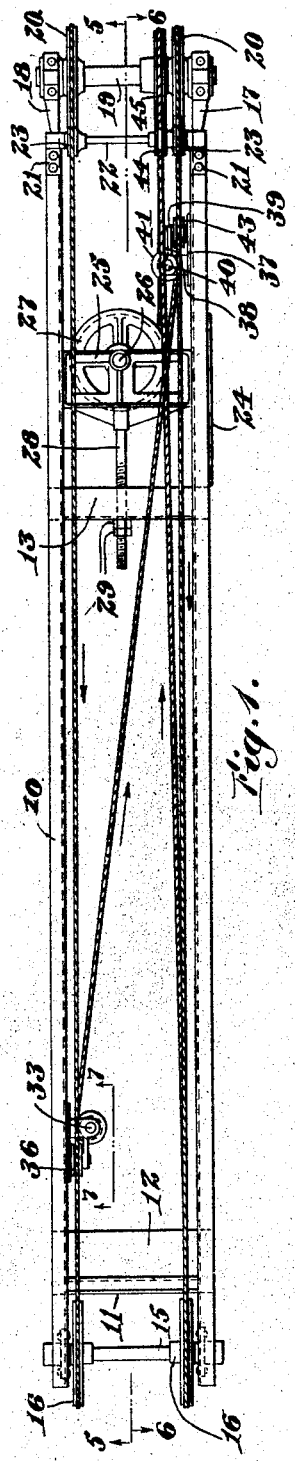
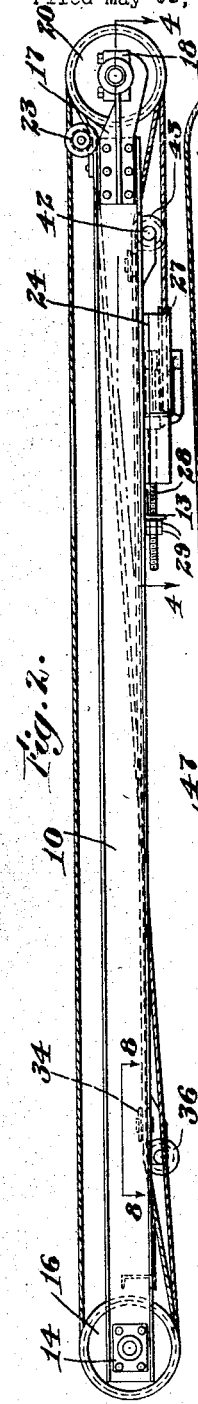
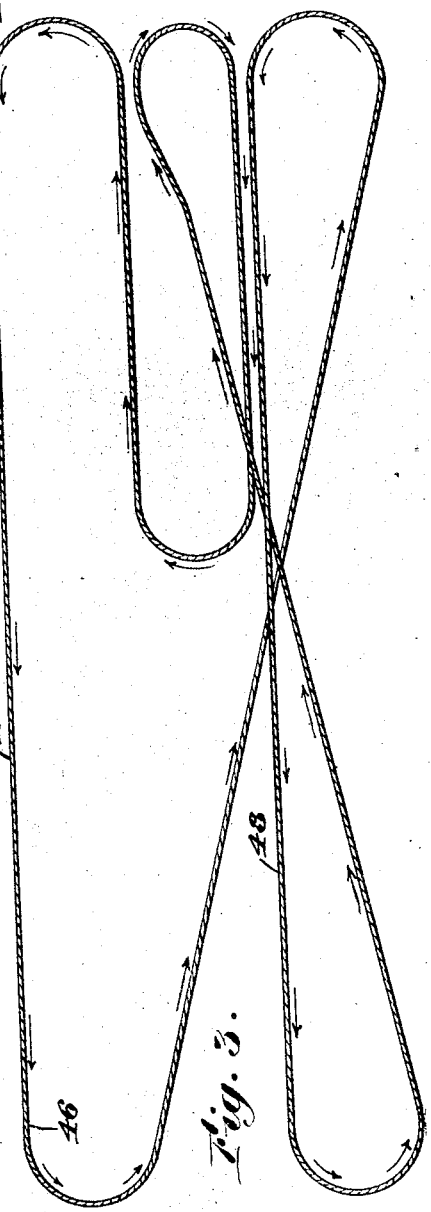

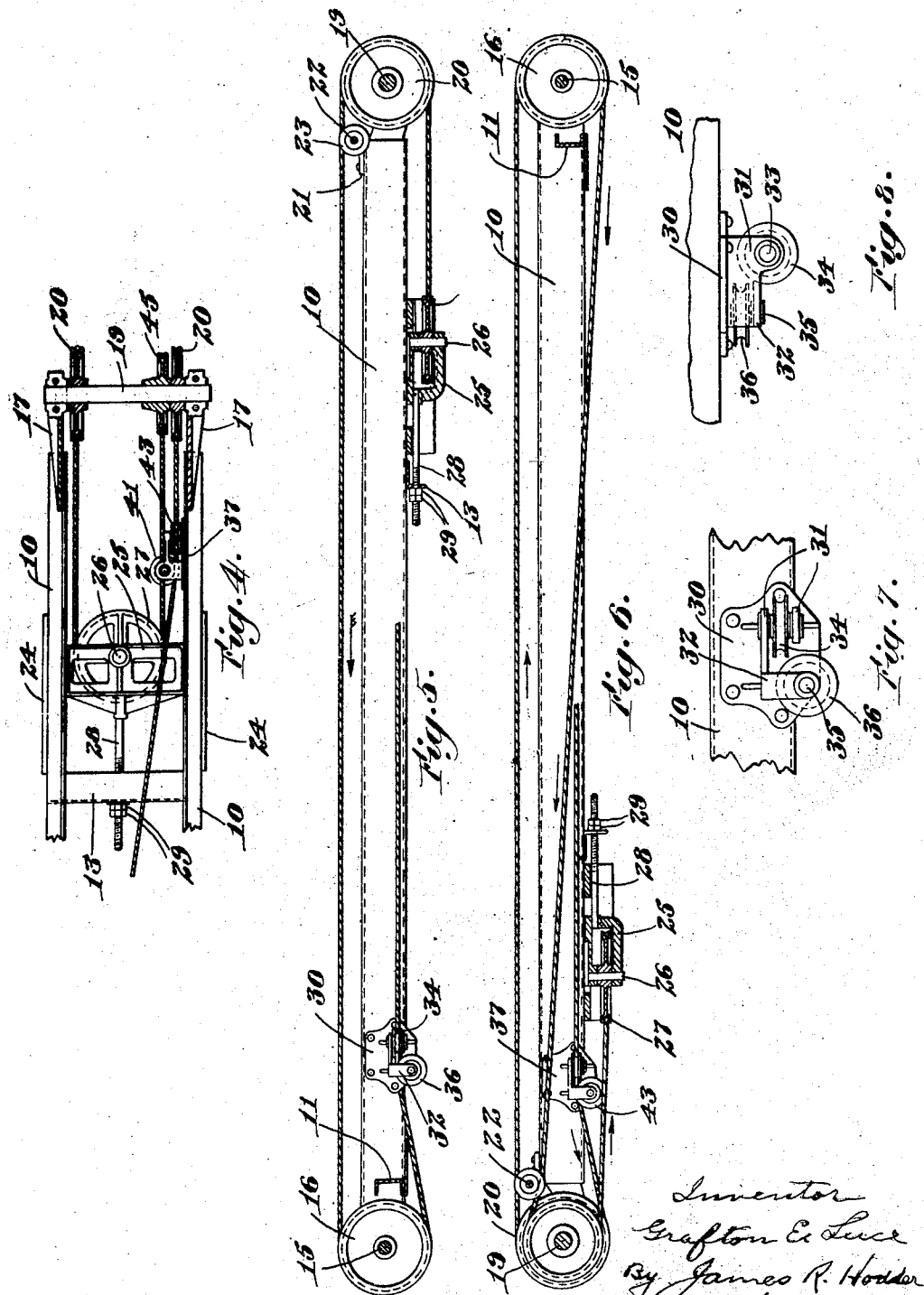

Patented Mar. 3, 1925.

1,528,557

UNITED STATES PATENT OFFICE.

GRAFTON E. LUCE, OF CHICAGO, ILLINOIS.

ROPE CONVEYER.

Application filed May 31, 1923. Serial No. 642,528.

*To all whom it may concern:*

Be it known that I, GRAFTON E. LUCE, a citizen of the United States, and resident of Chicago, in the county of Cook and State of Illinois, have invented an Improvement in Rope Conveyers, of which the following description, in connection with the accompanying drawings, is a specification, like letters on the drawings representing like parts.

In my present invention I have devised a novel conveying apparatus wherein the traveling and conveying element is a single endless member, so arranged that parallel parts of the same endless member travel in the same direction at the same speed.

Heretofore it has been customary to arrange a pair of endless belts, chains, ropes, cables or the like, with the conveying or working portions, using the upper or topmost line of travel of the conveying elements, spaced and parallel with means to keep the pulleys, guides or other means over which the pair of conveyers travel, in order to have the conveying parts travel in unison.

A difficulty with all such prior devices has been that there is usually more or less slippage, uneven tensioning and consequently a variation in the line of travel of two separate conveying elements. This is particularly true where a flexible cable is employed, as such cable is generally moved by frictional engagement over a pulley or pulleys and even if the driving elements are geared for uniform travel of the two separate conveyers, yet slippage, variation in slack, impossibility of having two pairs of belt tighteners operating simultaneously and in unison, etc., have rendered it impractical to depend upon the conveying portions of two separate elements operating in unison sufficiently for any great degree of accuracy.

My present invention obviates all the difficulties heretofore experienced in conveying devices of this class, and I have so devised and arranged a single rope conveyer as to take the place of two endless conveyers, this single conveyer being rove, led or stranded around the guiding elements and over a single tightener, so that constant and uniform strain and perfect uniformity in the travel of the conveyer is positively controlled and insured.

I believe that my invention of a single endless conveying member, so stranded as to provide two parts of the same layer, rope, chain, cable or the like, traveling in the same direction, to constitute a plurality of conveyer elements, equivalent to the prior practice of two endless conveyers arranged parallel, and yet insuring uniformity in the conveying part of the apparatus, is a distinct novelty in this art, and I wish to claim the same herein broadly.

Furthermore the arrangement of a single tightening member, insuring constant and uniform tension on a double line of traveling elements spaced from each other is new, and I wish to claim this feature broadly.

Also, so far as I am informed, the arrangement of pulleys and apparatus to lead a single endless conveyer in a path of travel whereby double parallel portions of the same endless conveyer, travel in spaced relation in the same direction, is new and is claimed herein broadly.

Furthermore, I believe that by my invention, wherein any slippage is automatically compensated for instantly, uniformly, and evenly, on both the parallel lines of travel of the conveyer, is a novelty of great importance and special advantage in my present invention, and the same is also claimed broadly herein.

Further features of the present invention, novel combinations and advantages will be hereinafter more fully pointed out and claimed.

In the accompanying drawings illustrating the preferred embodiment of my invention, Fig. 1 is a plan view;

Fig. 2 is a side elevation;

Fig. 3 is an isometric view, showing the method of stranding rope;

Fig. 4 is a plan section taken on the line 4—4 of Fig. 2;

Fig. 5 is a longitudinal section taken on the line 5—5 of Fig. 1;

Fig. 6 is a longitudinal section taken on the line 6—6 of Fig. 1;

Fig. 7 is an enlarged detail view on the line 7—7 of Fig. 1; and

Fig. 8 is an enlarged detail view taken on the line 8—8 of Fig. 2.

Referring to the drawings, there is shown a framework consisting of side members 10 secured together near one end by cross bar 11 and plate 12 and intermediate its ends by a cross bar 13, the members 11, 12, and 13 acting as separating means for holding the cross bars 10 in position separated from, and parallel to, each other.

Secured to one end of each of the side members or bars 10 are bearings 14 in alinement with each other and with perforations (not shown) in the side bars 11 and in such bearings 14 is rotatably mounted a shaft 15 near each end of which, and between the side bars 10, are secured grooved pulleys 16, the horizontal plane lying tangent to the grooved pulleys 16 and also parallel to the side bars 10 lying considerably above the horizontal plane in which lies the top surface or edge of the side bars 10. Secured to the ends of the side bars 10 remote from the bearings 14 and extending outwardly therefrom and in alinement therewith are plates 17 on the outer ends of which are bearings 18, the bearings being in alinement with each other and in such bearings is rotatably mounted a shaft 19. Secured to this shaft 19 near each end thereof and adjacent the bearings 18 are grooved pulleys 20, these pulleys being of the same diameter as the pulleys 16 and the grooves in the pulleys 16 and 20, adjacent each of the side bars 10, are in alinement with each other so that the top of the pulleys 16 and 20 lie in the same horizontal plane, as clearly shown in Figs. 2, 5, and 6. Secured to the upper end of the side bars 10 adjacent the members 18 are bearings 21 in alinement with each other and in these bearings is rotatably mounted a shaft 22 carrying at each end adjacent the bearings 21 grooved pulleys 23, the groove in each of these pulleys being in alinement with the grooves of the pulleys 20 and such pulleys 23 being considerably smaller in diameter than said pulleys 20. Secured to the under side of the cross bars 10 and between the cross bar 13 and the bearings 18 are guideways 24 in which is slidably mounted a crosshead 25 and in this crosshead is rotatably mounted on the vertical shaft 26 a grooved pulley 27, the groove of this pulley 27 lying substantially in the same horizontal plane in which lies the groove on the lower edge of the pulleys 20. Secured to the crosshead on the end remote from the shaft 26 is a threaded rod or a shaft 28 which extends through a perforation (not shown) in the cross bar 13 and is provided with a plurality of adjusting nuts 29 and by means of which the crosshead, and therefore the grooved pulley 27, may be adjusted relatively to the pulleys 20. Secured to one of the side bars 10, which is the upper side bar shown in Fig. 1, and adjacent the end carrying the bearing 14 is a bracket 30 (see Fig. 7), this bracket 30 having formed integral therewith bearing struts or members 31 and 32 respectively and in the strut 31 is secured a shaft 33 on which is rotatably mounted a grooved pulley 34, while secured in the struts 32 is a shaft 35 on which is rotatably mounted a grooved pulley 36, these pulleys being located at right angles to each other, as clearly shown in Fig. 7, with the pulley 34 lying in a horizontal plane while the pulley 36 lies in a vertical plane, as clearly shown in Figs. 1, 2, 5, and 6. Secured to the side of one of the frame bars 10, which is the lower frame bar as viewed in Fig. 1, is a bearing bracket 37 provided with bearing struts 38 and 39 and secured in the struts 38 is the shaft 40 on which is rotatably mounted a grooved pulley 41, while secured in the strut 39 is a shaft 42 on which is rotatably mounted a grooved pulley 43. The pulleys 34, 36, 41, and 43 are guide pulleys, as will be hereinafter described, and the groove in the pulley 43 is in alinement with the grooves in the pulley 23, although not necessarily in the same horizontal plane. Also the groove in the pulley 36 is in alinement with the grooves in the pulley 16 adjacent the upper frame bracket 10 (as viewed in Fig. 1), although also not necessarily in the same horizontal plane. On the shaft 22 and adjacent the pulley 23 is a grooved pulley 44, the groove of which is in alinement with the groove in the pulley 45 that is mounted on the shaft 19.

Referring now to Fig. 3, which is an isometric view showing the method of stranding a single rope so as to enable me to obtain two reaches running parallel to each other and in the same direction, thus having the two reaches act as a conveyer of two elements, both elements running in synchronism. In Fig. 3, and starting at the point 46, the rope makes a straight reach 47, rides over the upper pulley 23 (see Fig. 1), then over the upper pulley 20, around the pulley 27, up and around the pulley 45, under the pulley 44, up and around the lower pulley 16, forming, from this point, a straight reach 48 that lies parallel to the straight reach 47 and passes over the pulley 23, over and under the lower pulley 20, over the pulley 43, and around the pulley 41, around the pulley 34, over the pulley 36 and up and over the pulley 16 to the point 46.

This arrangement of pulleys therefore enables me to successfully use a single endless rope, chain, or the like, and form therewith a conveyer having two straight, parallel reaches that run in absolute synchronism with each other and in the same direction. To provide for taking up the slack or to compensate for wear, stretching, or the like, the crosshead 25 may be readily moved by means of the adjusting nuts 23 and threaded bolt on the shaft 28.

While I have necessarily shown and described the preferred embodiment of my invention somewhat in detail, it is to be understood that I may vary the size, shape, and arrangement of parts within wide limits without departing from the spirit of the invention.

My invention is further described and defined in the form of claims as follows:

1. A single conveying element, in combination with means to conduct predetermined parts of said conveying element in parallel paths lying in the same horizontal plane while said predetermined parts travel in the same direction.

2. A single conveying element, in combination with means to conduct predetermined parts of said conveying element in parallel paths lying in the same horizontal plane while said predetermined parts travel in the same direction and at uniform speed.

3. A single conveying element, in combination with means to conduct predetermined parts of said conveying element in parallel paths lying in the same horizontal plane while said predetermined parts travel in the same direction and at uniform speed, together with a single tensioning member.

4. A conveyer comprising an endless flexible member, a plurality of guiding means over which said member is led, means to rotate one of said guiding members to impart motion to said conveyer, said guiding means conforming the single endless member into double lines of parallel conveying instrumentalities that lie in the same horizontal plane.

5. A conveyer comprising an endless flexible member, a plurality of guiding means over which said member is led, said guiding means conforming the single endless member into double lines of parallel conveying instrumentalities lying in the same horizontal plane, together with an adjustable tightening guide adapted to place uniform tension upon the parallel lines of travel of said conveyer.

In testimony whereof, I have signed my name to this specification.

GRAFTON E. LUCE.